United States Patent
Hiraiwa

(10) Patent No.: US 8,556,054 B2
(45) Date of Patent: Oct. 15, 2013

(54) SHIFT DEVICE ADAPTED FOR TRANSMISSION

(75) Inventor: Kazuyoshi Hiraiwa, Yokohama (JP)

(73) Assignee: Kyowa Metal Works Co., Ltd., Yokohama-Shi (JP)

( * ) Notice: Subject to any disclaimer, the term of this patent is extended or adjusted under 35 U.S.C. 154(b) by 461 days.

(21) Appl. No.: 12/894,523

(22) Filed: Sep. 30, 2010

(65) Prior Publication Data

US 2011/0079482 A1    Apr. 7, 2011

(30) Foreign Application Priority Data

Oct. 5, 2009    (JP) .................................. 2009-231127

(51) Int. Cl.
 *F16D 23/06* (2006.01)
(52) U.S. Cl.
 USPC ............. 192/53.34; 192/53.362; 192/99 A; 74/339
(58) Field of Classification Search
 USPC ............. 192/53.34, 53.36–53.362; 74/339
 See application file for complete search history.

(56) References Cited

U.S. PATENT DOCUMENTS

| 6,244,404 B1* | 6/2001 | Kim ........................... 192/53.34 |
| 8,020,682 B2* | 9/2011 | Saito et al. ............... 192/53.362 |
| 2004/0163917 A1* | 8/2004 | Hiraiwa ..................... 192/53.34 |

FOREIGN PATENT DOCUMENTS

| JP | 9-89002 | 3/1997 |
| JP | 2005-113975 | 4/2005 |

\* cited by examiner

*Primary Examiner* — David D Le
*Assistant Examiner* — Jacob S Scott
(74) *Attorney, Agent, or Firm* — Wenderoth, Lind & Ponack, L.L.P.

(57) ABSTRACT

A sleeve has splines formed with a groove, a high-speed-stage slanting surface and a turn-off slanting surface. A synchronizer ring has splines and first projecting portions. Lever members are arranged among the sleeve, the hub and the synchronizer ring to transmit pushing force from the sleeve to the synchronizer ring. The synchronizer ring is pushed against a speed gear to generate frictional torque, being pushed by the lever members pressed by a high-speed-stage slanting surface. The lever members turn over and transmit pushing force applied from a turn-over slanting surface to the synchronizer ring so as to press a frictional surface against a cone surface to synchronize them when the sleeve moves in a direction opposite to the speed gear. A diameter of the first inner diameter portion is set larger than that of the second inner diameter portion.

4 Claims, 4 Drawing Sheets

SHIFT DEVICE ADAPTED FOR TRANSMISSION

BACKGROUND OF THE INVENTION

1. Field of the Invention

The present invention relates to a shift device adapted for a transmission in which pushing force applied to a sleeve can be amplified into larger pushing force acting on a synchronizer ring while gears of the transmission are shifted, thereby decreasing operating force necessary for a driver or an actuator.

2. Description of the Related Art

A shift device adapted for a transmission of this kind is disclosed in Japanese Unexamined Patent Application Publication No. 09-89002. In this shift devices, a plurality of lever members are provided between a hub and a synchronizer ring that is pressable to a fifth speed gear. When a transmission is shifted to a reverse position, operating force of a sleeve, which acts in a direction opposite to the fifth speed gear, is transmitted to the synchronizer ring due to reaction of the lever members so as to press the synchronizer ring to the fifth speed gear. This induces synchronization between the synchronizer ring and the fifth speed gear to decrease a rotation speed due to inertia of a clutch disc of an input shaft side, and then a reverse gear moving together with the sleeve is moved and engaged with reverse drive and driven gears without engagement noise.

In this reverse shift operation, the lever members are moved outwardly in a radial direction due to frictional torque generated by the synchronizer ring to block a movement of the sleeve until the synchronization of the fifth speed gear and the synchronizer ring ends.

After the synchronization ended, blocking force due to the frictional torque of the synchronizer ring vanishes. This enables the sleeve to move to the fifth speed gear to finish the shift operation to the reverse position, pressing and moving the lever members inwardly in the radial direction through slanting surfaces formed on inner splines of the sleeve.

In these shift operations, the lever members are pushed outwardly in the radial direction due to centrifugal force generated according to rotation thereof. This needs that the sleeve has to overcome the centrifugal force to press the lever members inwardly in order to further move after the synchronization ends. In a slow shift toward the fifth speed at high vehicle speed running, force to overcome the centrifugal force occasionally becomes larger than operating force necessary for the synchronization. Especially, in a case where a synchronizer device of the fifth speed is provided on an output shaft, operating force to overcome the centrifugal force becomes heavy as much as a driver feels uncomfortable because the synchronizer device rotates at higher speed than the device provided on an input shaft and the centrifugal force increases in proportion to square of rotational speed.

In order to improve the above-described drawback, the inventor suggested forming the inner splines of the sleeve to have smaller tilt angle so as to decrease force to overcome centrifugal force in Japanese Unexamined Patent Application Publication No. 2005-113975.

This suggestion, however, needs to overcome the centrifugal force acting on the lever members from the end of synchronization to the end of shift operation. Accordingly, a driver feels uncomfortable when he or she operates the shift device at high vehicle speed running.

It is, therefore, an object of the present invention to provide a shift device adapted for a transmission which overcomes the foregoing drawbacks and can remove the need for overcoming the centrifugal force acting on the lever members after the end of synchronization, thereby making a driver feel comfortable to operate the shift device at high vehicle speed running.

SUMMARY OF THE INVENTION

According to an aspect of the present invention there is provided a shift device adapted for a transmission, which includes a shaft for transmitting drive power, a hub, a sleeve, a speed gear, a synchronizer ring and a plurality of lever members. The hub has a boss portion splined with the shaft, a ring portion located outwardly away from the boss portion and formed on an outer peripheral surface thereof with splines, and a flange portion connecting the boss portion and the ring portion. The ring portion and the flange portion are formed with a plurality of cut-off portions. The sleeve is supported on the hub. The sleeve is provided on an inner peripheral surface thereof with splines which engage with the splines of the ring portion of the hub, and the splines of the sleeve are formed with a groove on an inner circumferential surface of the sleeve, a first inner diameter portion and a second inner portion each formed on the inner circumferential surface of the sleeve, a high-speed-stage slanting surface provided between a bottom of the groove and the first inner diameter portion, and a turn-off slanting surface provided between the bottom of the groove and the second inner diameter portion. The speed gear has splines engageable with the splines of the sleeve and a cone surface at a hub side. The synchronizer ring has a friction surface pressable on the cone surface of the speed gear on an inner surface of the synchronizer ring. The splines of the synchronizer ring have chamfer surfaces on an outer circumference thereof, and first projecting portions extend in an axial direction at the hub side. The lever members are arranged among the sleeve, the hub and the synchronizer ring. The lever members are capable of transmitting pushing force generated due to an axial movement of the sleeve to the synchronizer ring. The frictional surface of the synchronizer ring is pushed against the cone surface of the speed gear to generate frictional torque, being pushed by the lever members pressed by the high-speed-stage slanting surface of the sleeve so that the synchronizer ring is synchronized with the speed gear with pushing force generated due to a movement of the sleeve through the splines of the synchronizer ring. The lever members turn over and transmit pushing force applied from the turn-over slanting surface of the sleeve to the synchronizer ring to press the friction surface of the synchronizer ring against the cone surface of the speed gear to synchronize the synchronizer ring and the speed gear when the sleeve moves in a direction opposite to a speed gear side. A diameter of the first inner diameter portion is set to be larger than that of the second inner diameter portion.

Therefore, the shift device of the invention can remove the need for overcoming the centrifugal force acting on the lever members after the end of synchronization, thereby making a driver feel comfortable to operate the shift device at high vehicle speed running.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
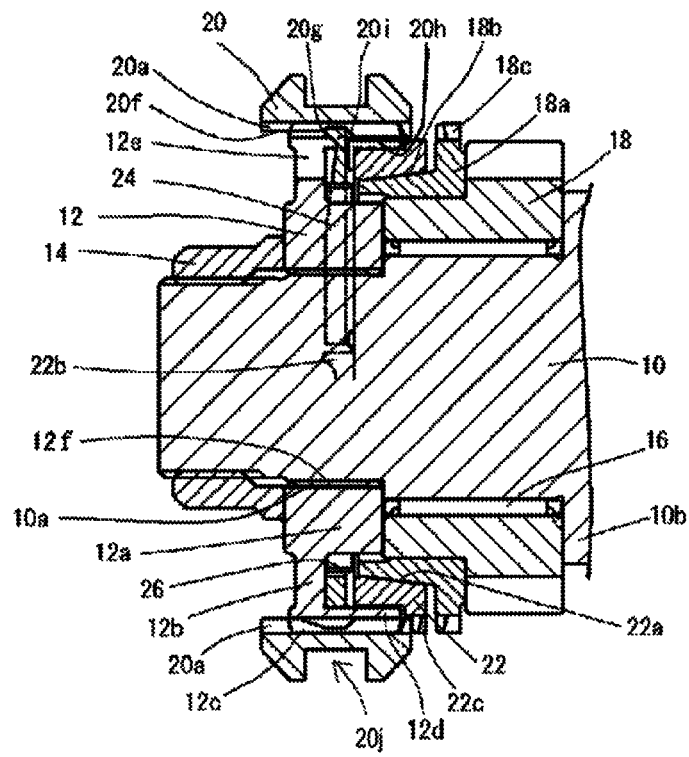
FIG. 1 is a cross-sectional plan view, taken along the line A-A in FIG. 2, showing a shift device adapted for a transmission of a first embodiment according to the present invention.

Throughout the following detailed description, similar reference characters and numbers refer to similar elements in all figures of the drawings, and their descriptions are omitted for eliminating duplication.

Referring to FIG. 1 of the drawing, there is shown a shift device of a first preferred embodiment according to the present invention. The shift device is adapted for a transmission mounted on a motor vehicle to establish a fifth speed in this embodiment.

The shift device includes an output shaft 10, a hub 12, a fifth speed gear 18, a sleeve 20, a synchronizer ring 22 and two lever members 24.

The output shaft 10 is connected with not-shown drive wheels through not-shown differential gears. The output shaft 10 is partially formed on an outer surface thereof with splines 10a, which mesh with splines 12f formed on an inner surface of a boss portion 12a of the hub 12. The hub 12 is secured to the output shaft 10 by using a nut 14.

The fifth speed gear 18 is arranged between the boss portion 12a of the hub 12 and a large-diameter portion 10b of the output shaft 10, being rotatably supported by the output shaft 10 through a bearing 16. The fifth speed gear 18 is always meshed with a not-shown fifth-speed drive gear that is integrally formed with a not-shown input shaft, being rotatable together with a not-shown clutch disc and engageable with a not-shown output shaft of an engine.

The fifth speed gear 18 is integrally formed with a clutch gear 18a, which has a cone surface 18b at its hub side and splines 18c on its outer circumference.

The hub 12 includes the boss portion 12a, a flange portion 12b extending from the boss portion 12a outwardly in a radial direction of the hub 12, and a ring portion 12d provided on an outer circumference of the flange portion 12b. The ring portion 12d is formed with splines 12c on its outer circumference. The hub 12 has two cut-off portions 12e extending in the radial direction from the ring portion 12d to the flange portion 12b. These cut-off portions 12e are also indicated by broken line in FIG. 2.

Figure 7:
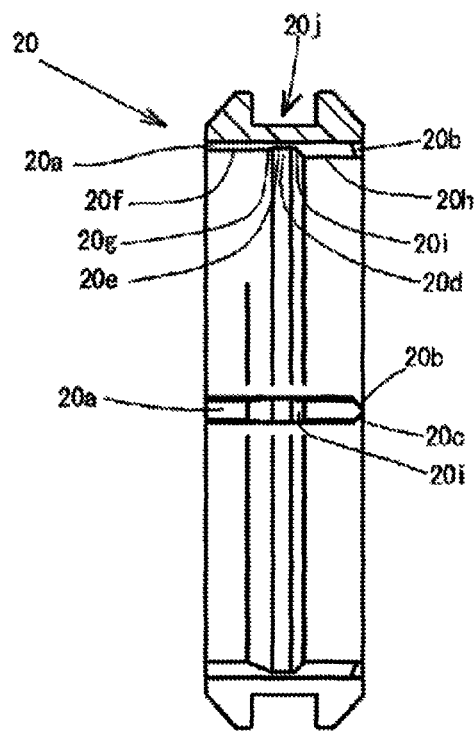
FIG. 7 is a cross-sectional view showing a sleeve which is used in the shift device shown in FIG. 1.
Figure 8:
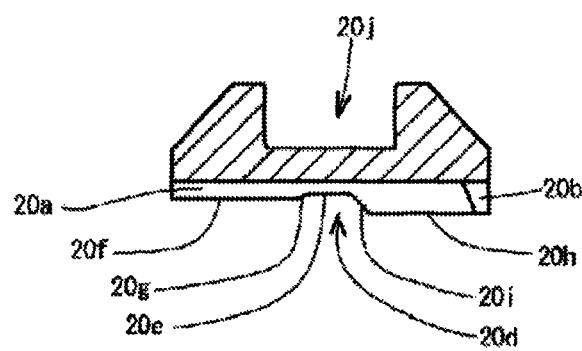
FIG. 8 is an enlarged fragmentary cross sectional view showing the sleeve, which is used in the shift device shown in FIG. 1.

The sleeve 20 is provided on the outer circumference of the hub 12. The sleeve 20 has splines 20a at its inner surface to always engage with the splines 12c of the hub 12 so as to be movable in an axial direction of the hub 12. The splines 20a of the sleeve 20 move toward the fifth speed gear 18 to engage with the splines 18c formed on the clutch gear 18a of the fifth speed gear 18 when a shift operation to the fifth speed is ended. As shown in FIGS. 7 and 8, the splines 20a of the sleeve 20 are formed with chamfer surfaces 20b and 20c on fifth-speed-gear-side end portions thereof, also with a circumferential directional groove 20d on an inner central portion thereof, and also with a high-speed-stage slanting surface 20g and a turn-off slanting surface 20i.

Specifically, the splines 20a of the sleeve 20 have first inner diameter portion 20f and second inner diameter portion 20h. The first inner diameter portion 20f is disposed at the side opposite to the fifth speed gear 18 with respect to the groove 20d, while the second inner diameter portion 20h is disposed at the fifth-speed-gear side with respect to the groove 20d. A diameter of the first inner diameter portion 20f is set to be larger than that of the second inner diameter portion 20h.

The high-speed-stage slanting surface 20g is formed between a bottom 20e of the groove 20d and the first inner diameter portion 20f, and the turn-off slanting surface 20i is formed between the bottom 20e and the second inner diameter portion 20h to face the high-speed-stage slanting surface 20g.

The first inner diameter portion 20f may be formed only on limited splines that contact with top portions 24a of the lever members 24, of all splines 20a.

The sleeve 20 is further formed with a fork groove 20j on its outer circumference to receive a not-shown shift fork. FIG. 1 shows that the sleeve 20 is placed in a neutral position. The sleeve 20 is capable of moving from the neutral position toward the fifth speed gear 18 to obtain the fifth speed, and moving away from the fifth speed gear 18 to obtain a reverse drive.

Figure 3:
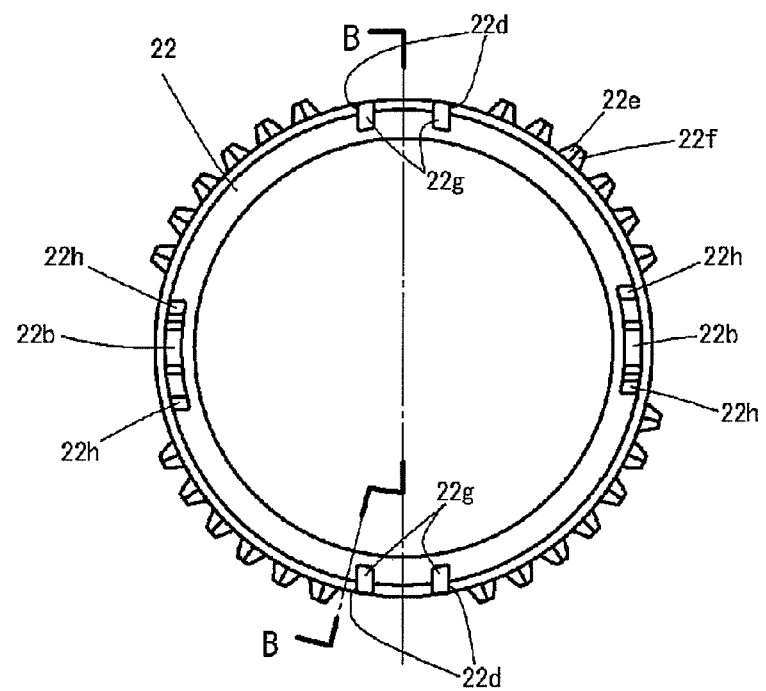
FIG. 3 is a front view showing a synchronizer ring of the shift device shown in FIG. 1.
Figure 4:
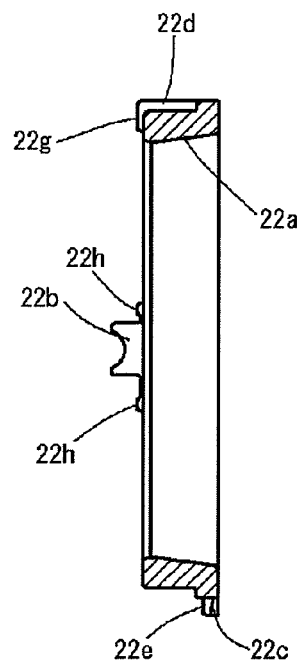
FIG. 4 is a cross sectional view, taken along the line B-B in FIG. 3, showing the synchronizer ring shown in FIG. 3.

As shown in FIG. 1, the synchronizer ring 22 is arranged between the fifth speed gear 18 and the hub 12. As shown in FIGS. 1, 3 and 4, the synchronizer ring 22 is formed on its inner surface with a cone-shaped frictional surface 22a corresponding to a cone surface 18b of the fifth speed gear 18. Two first projecting portions 22b are formed on a hub side of the synchronizer ring 22 to extend in an axial direction, and splines 22c and two second projecting portions 22d are formed on its outer circumference. The splines 22c have chamfer surfaces 22e and 22f at the side opposite to the fifth speed gear 18 of the splines 22c. Fifth-speed pressure receiving surfaces 22g are formed on the second projecting portions 22d at their hub sides, and reverse pressure receiving surfaces 22h are formed near and at both sides of the first projecting portions 22b.

As shown in FIG. 1, the two lever members 24 are arranged between the synchronizer ring 22 and the hub 12.

Figure 5:
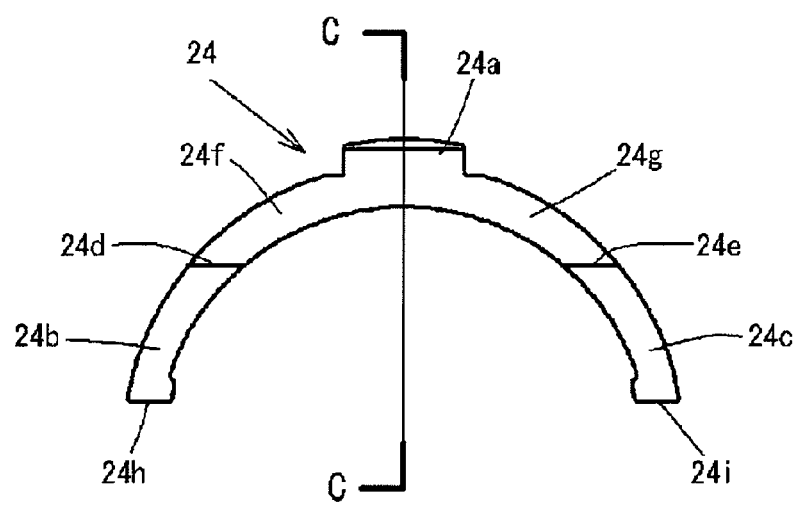
FIG. 5 is a front view showing the lever member.
Figure 6:
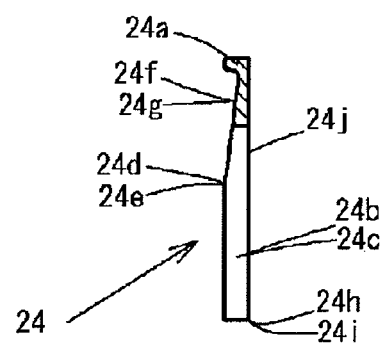
FIG. 6 is a cross sectional view, taken along the line C-C in FIG. 5, showing the lever member.

As shown in FIGS. 5 and 6, the lever members 24 are formed with the top portion 24a at their central portions, having circular-arc shaped arms 24b and 24c at both sides of the top portion 24a. The arms 24b and 24c are formed with slanting-surfaced depressions 24f and 24g, respectively. The intermediate portions of the arms 24b and 24c function as reverse fulcrums 24d and 24e, respectively. The fifth-speed-gear sides of the lever members 24 form a pressing surface 24j.

As shown in FIG. 1, the top portions 24a of the lever members 24 are engaged with the cut-off portions 12e, respectively, so that the lever members 24 can move in the radial direction and in the axial direction.

A C-shaped spring 26 is provided at the inside of lever members 24 to apply its elastic expansion force on them so that the lever members 24 are pushed outwardly in the radial direction. When the lever members 24 are positioned at the outer side in the radial direction, outer sides of the top portions 24a are received in the groove 20d of the sleeve 20.

The first projecting portions 22b of the synchronizer ring 22 are engageable with the two lever members 24 with rotational clearances therebetween, while the second projecting portions 22d are engageable with the cut-off portions 12e of the hub 12 with rotational clearances therebetween.

In other words, the synchronizer ring 22 can be somewhat rotated relative to the hub 12 and the lever members 24, and its movable amount is approximately ¼ of a pitch of the splines 12c of the hub 12.

Figure 2:
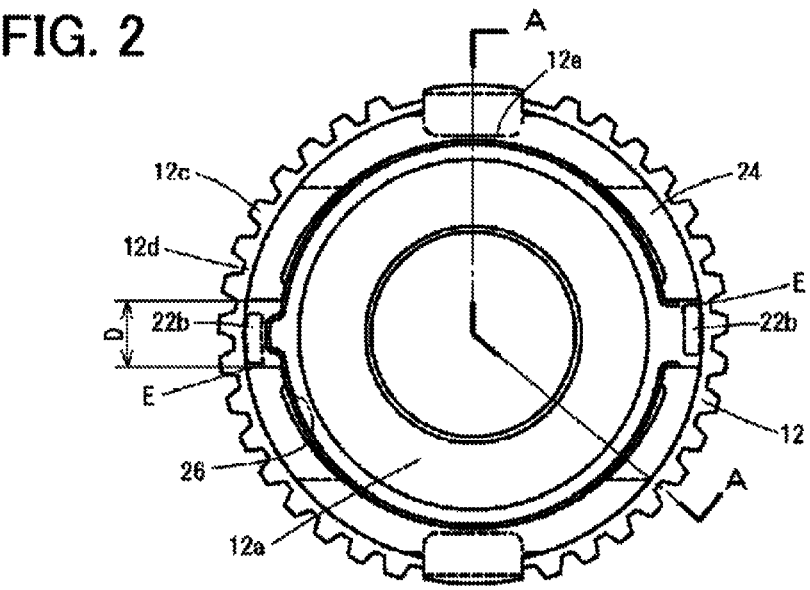
FIG. 2 is a front view showing a hub with lever members and a spring of the shift device shown in FIG. 1.

The shift device of the embodiment is constructed in such a way that the length D (shown in FIG. 2) of clearances between the lever members 24 can be slightly larger than the movable amount of the synchronizer ring 22, but the movable amount of the synchronizer ring 22 becomes small when the lever members 24 move most-inwardly in the radial direction. Incidentally, FIG. 2 shows a state where the synchronizer ring 22 is rotated and its second projecting portions 22d contact with the cut-off portions 12e of the hub 12.

The diameter of the first inner diameter portion 20f is set in such a way that the lever members 24 are pushed by the high-speed-stage slanting surface 20g of the sleeve 20 until the splines 20a of the sleeve 20 contact with the splines 22c of the synchronizer ring 22 when the sleeve 22 moves toward the fifth speed gear 18 and also in such a way that the lever members 24 become free from the high-speed-stage slanting surface 20g after the splines 20a of the sleeve 20 contact with the splines 22c of the synchronizer ring 22.

Next, the operation of the shift device of the first embodiment will be explained. In order to shift to the fifth speed position, the not-shown shift fork moves the sleeve 20 toward the fifth speed gear 18. The high-speed-stage slanting surface 20g of the sleeve 20 pushes the top portions 24a of the lever members 24, which are received in the groove 20d of the sleeve 20. This causes the pressing surfaces 24j of the lever members 24 to push the fifth-speed pressure receiving surface 22g of the synchronizer ring 22 toward the fifth speed gear 18.

The lever members 24 are pushed against the sleeve 20 outwardly in the radial direction due to elastic expansion force of the spring 26 and centrifugal force acting on the lever members 24. Consequently, the high-speed-stage slanting surface 20g of the sleeve 20 pushes the synchronizer ring 22 according to the expansion force generated by the spring 26 and the centrifugal force, whereby the frictional surface 22a of the synchronizer ring 22 is pressed against the cone surface 18b of the fifth speed gear 18.

In this state, when a rotational speed difference occurs between the output shaft 10 and the fifth speed gear 18, friction torque generates between the frictional surface 22a and the cone surface 18b, rotating the synchronizer ring 22 relative to the hub 12. In other words, the synchronizer ring 22 is allowed to rotate with some rotational amount relative to the hub 12. Accordingly, the second projecting portions 22d of the synchronizer ring 22 rotate to contact the cut-off portions 12e of the hub 12. In this rotational movement, the first projecting portions 22b of the synchronizer ring 22 rotate between the lever members 24 (within the length D), still keeping the clearance therebetween as shown in FIG. 2.

The sleeve 20 further moves toward the fifth speed gear 18, the high-speed-stage slanting surface 20g of the sleeve 20 applying component force of the operating force applied from the sleeve 20 on the lever members 24 to overcome the expansion force due to the spring 26 and the centrifugal force, and thereby the sleeve 20 moves the lever members 24 inwardly in the radial direction.

Then, either of the chamfer surfaces 20c or 20b of the sleeve 20 contact with either of the chamfer surfaces 22e or 22f of the splines 22c of the synchronizer ring 22.

At about the same time when the chamfer surfaces 20c, 20b contact with the chamfer surfaces 22e, 22f, the contact of the high-speed-stage slanting surface 20g of the sleeve 20 and the top portions 24a of the lever members 24 is ended. After then, the top portions 24a become to contact with the first inner diameter portion 20f and the clearances E shown in FIG. 2 become zero, so that the first projecting portions 22b contact with the end portions 24h and 24i of the arms 24b and 24c of the lever members 24.

After this contact, the sleeve 20 directly presses the synchronizer ring 22 through the chamfer surfaces 20c, 20b and 22e, 22f.

Consequently, the frictional surface 22a and the cone surface 18b are strongly pressed against each other, and the friction force becomes larger, thereby causing friction torque acting on the synchronizer ring 22 to be larger. The friction torque generates blocking force to block the further movement of the sleeve 20 toward the fifth speed gear 18 through the chamfer surfaces 20c, 20 b and 22e, 22f.

The angles of the chamfer surfaces 20c, 20b, 22e and 22f are set appropriately in such a way that the blocking force overcomes the operating force applied from the sleeve 20, even if it is strong, to block the further movement of the sleeve 20 through either of the chamfer surfaces 22e or 22f as long as the friction torque generates between the frictional surface 22a and the cone surface 18b.

Thus, the sleeve 20 maintains to press the synchronizer ring 22 toward the fifth speed gear 18 so as to proceed with synchronization thereof until the rotational speed difference vanishes between the output shaft 10 and the fifth speed gear 18.

When the rotational speed difference vanishes between the output shaft 10 and the fifth speed gear 18, namely when the synchronization ends, the friction torque between the frictional surface 22a and the cone surface 18b becomes substantially zero. Accordingly, the blocking force vanishes, so that the sleeve 20 can move toward the fifth speed gear 18, somewhat rotating the synchronizer ring 22 and the fifth speed gear 18 through the chamfer surfaces 20c, 20b of the sleeve 20. Then, the splines 20a of the sleeve 20 engage with the splines 18c of the fifth speed gear 18 that has no substantial rotational speed difference relative to the sleeve 20. This is the end of the shift operation to the fifth speed.

In this state, the high-speed-stage slanting surface 20g of the sleeve 20 and the top portions 24a of the lever members 24 do not contact each other, and accordingly there is no need to press and move the lever members 24 inwardly in the radial direction. This means that the operating force to move the sleeve 20 is free from the centrifugal force acting on the lever members 24 and the elastic expansion force of the spring 26.

Therefore, in the shift operation to the fifth speed at high vehicle running speed, the operating force to move the sleeve 20 after the synchronization becomes smaller because it is free from the centrifugal force acting on the lever members 24 and the elastic expansion force of the spring 26. This provides more comfortable shift operation feeling relative to that obtained from devices of the prior art.

Next, in order to shift the transmission from the neutral position to the reverse position, the sleeve 20 is moved in the direction opposite to the fifth speed gear 18.

Normally, the shift operation to the reverse position is performed in a state where the vehicle stops and the rotational speed of the output shaft 10 is zero.

On the other hand, even when the not-shown clutch is released, the not-shown clutch disc and input shaft sometimes rotate because of their inertia. Uncomfortable engagement noise generates when not-shown reverse gear and reverse drive and driven gears are engaged with each other in the state where the clutch disc and input shaft rotate. The shift device of the embodiment solves this problem as follows.

The fork moves the sleeve 20 in the direction opposite to the fifth speed gear 18, and thereby the turn-over slanting surface 20i of the sleeve 20 pushes and moves the top portions 24a of the lever members 24 in the opposite direction. As a result, the reverse fulcrum 24d and 24e of the lever members 24 contact with the flange portion 12b of the hub 12, and the end portions 24h and 24i of the arms 24b and 24c of the lever members 24 press the reverse pressure receiving surfaces 24h toward the fifth speed gear 18 around the reverse fulcrum 24d and 24e.

In other words, the lever members 24 push the synchronizer ring 22 in a direction opposite to the movement direction of the sleeve 20 under the turn-off operation around contact portions of the reverse fulcrums 24d, 24e and the flange portion 12b of the hub 12.

In an initial stage of this operation, the synchronizer ring 22 is pushed by the component force of the elastic expansion force of the spring 26 that pushes the lever members 24 outwardly in the radial direction.

In a case where the output shaft 10 stops its rotation and the fifth speed gear 18 rotates, the synchronizer ring 23 is pushed toward the fifth speed gear 18, and it rotates relative to the hub 12 and the lever members 24 due to the friction torque generated between the frictional surface 22a and the cone surface 18b. In this operation, the synchronizer ring 22 rotates until the second projecting portions 22d contact with the cut-off portions 12e of the hub 12. There are, however, still clearances between the first projecting portions 22b and the lever members 24 as shown in FIG. 2.

When the sleeve 20 is further pushed in the opposite direction, the turn-off slanting surface 20i of the sleeve 20 overcomes the elastic expansion force of the spring 26 to move the lever members 24 inwardly in the radial direction, so that the sleeve 20 further moves in the opposite direction. Then, the clearances E, shown in FIG. 2, become zero, so that the end portions 24h or 24i of the arms 24c of the lever members 24 contact with the first projecting portions 22b of the synchronizer ring 22. The frictional torque generated between the frictional surface 22a and the cone surface 18b acts on synchronizer ring 22, which causes the first projecting portions 22b to block the further movement of the lever members 24 toward the inside.

Herein, the tilt angle of the turn-off slanting surface 20i of the sleeve 20 is set appropriately in such a way that the lever members 24 cannot move inwardly in the radial direction, thereby blocking the sleeve 20 to move in the opposite direction as long as the friction torque exists between the frictional surface 22a and the cone surface 18b.

Accordingly, the turn-off slanting surface 20i of the sleeve 20 pushes the top portions 24a of the lever members 24, so that the synchronizer ring 22 is kept strongly pressed toward the fifth speed gear 18 under the turn-off operation, producing the synchronization operation.

As the synchronization proceeds and the fifth speed gear 18 stops its rotation, the friction torque vanishes between the frictional surface 22a and the cone surface 18b. Accordingly, the blocking force to block the further movement of the sleeve 20 also vanishes, so that the sleeve 20 further moves in the opposite direction, the turn-off slanting surface 20i of the sleeve 20 pushing and moving the lever members 24 inwardly in the radial direction. Then, the not-shown reverse gear, which moves together with the sleeve 20, is engaged with not-shown reverse drive and driven gears. This engagement can be performed without uncomfortable engagement noise because the clutch disc and the fifth speed gear 18 have been already stopped before they are engaged.

As understood from the above-described explanation, in the shift device of the embodiment, the turn-off slanting surface 20i has large tilt angle in order to perform the blocking function, while the high-speed-stage slanting surface 20g may have small tilt angle because they do not need the blocking function. In addition, they are set in such a way that the contact between the high-speed-stage slanting surface 20g of the sleeve 20 and the top portions 24a of the lever members 24 ends at about the same time when the chamfer surfaces 20c, 20b and 22e, 22f contact with each other.

Therefore, the shift device of the embodiment can decrease the force to push and move the lever members 24 inwardly in the radial direction against the centrifugal force in the shift operation to the fifth speed at high vehicle running speed. In addition, after the synchronization, there is no need to push and move the lever members 24 inwardly in the radial direction.

As a result, the operating force necessary for moving the sleeve 20 after the synchronization is free from the centrifugal force acting on the lever members 24 and the elastic expansion force of the spring 26. This provides the shift device of the embodiment with more comfortable shift operation feeling relative to those of the prior art.

While there have been particularly shown and described with reference to preferred embodiments thereof, it will be understood that various modifications may be made therein, and it is intended to cover in the appended claims all such modifications as fall within the true spirit and scope of the invention.

The shift device with the synchronizer is mounted on the output shaft 10 in the embodiment, but it may be mounted on an input shaft.

The slanting-surfaced depressions 24f and 24g are formed on the lever members 24 so as to form the reverse fulcrums 24d and 24e and they contact the flange portion 12b of the hub 12 having a flat surface in the embodiment, but the depressions may be formed on the flange portion 12b of the hub 12 and the lever members 24 may have a flat surface that contacts with the flange portion 12b.

The shift device has the fifth speed gear 18 in the embodiment, but the speed gear may be a different speed gear.

The number of the lever members is not limited to two, but it may be set appropriately.

The synchronizer ring 22 may have an oil groove on its inner friction surface in order to increase a friction coefficient of the friction surface, and may be made of material for improving synchronizing performance.

The shift device may be manually operated, or mechanically operated by an actuator.

The entire contents of Japanese Patent Application No. 2009-0231127 filed Oct. 5, 2009 are incorporated herein by reference.

What is claimed is:

1. A shift device adapted for a transmission comprising:
   a shaft for transmitting drive power;
   a hub having a boss portion splined with the shaft, a ring portion located outwardly away from the boss portion and formed on an outer peripheral surface thereof with splines, and a flange portion connecting the boss portion and the ring portion, the ring portion and the flange portion being formed with a plurality of cut-off portions;
   a sleeve slidably supported on the hub, the sleeve being provided on an inner peripheral surface thereof with splines which engage with the splines of the ring portion of the hub, the splines of the sleeve being formed with a groove on an inner circumferential surface of the sleeve, a first inner diameter portion and a second inner portion each formed on the inner circumferential surface of the sleeve, a high-speed-stage slanting surface provided between a bottom of the groove and the first inner diameter portion, and a turn-off slanting surface provided between the bottom of the groove and the second inner diameter portion;

a speed gear having splines engageable with the splines of the sleeve and a cone surface at a hub side;

a synchronizer ring having a friction surface pressable on the cone surface of the speed gear on an inner surface of the synchronizer ring, splines having chamfer surfaces on an outer circumference of the synchronizer ring, and first projecting portions extending in an axial direction at the hub side; and a plurality of lever members arranged among the sleeve, the hub and the synchronizer ring, the lever members being capable of transmitting pushing force generated due to an axial movement of the sleeve to the synchronizer ring, wherein the frictional surface of the synchronizer ring is pushed against the cone surface of the speed gear to generate frictional torque, the synchronizer ring being pushed by the lever members pressed by the high-speed-stage slanting surface of the sleeve so that the synchronizer ring is synchronized with the speed gear with pushing force generated due to a movement of the sleeve through the splines of the synchronizer ring, wherein the lever members turn over and transmit pushing force applied from the turn-over slanting surface of the sleeve to the synchronizer ring to press the friction surface of the synchronizer ring against the cone surface of the speed gear to synchronize the synchronizer ring and the speed gear when the sleeve moves in a direction opposite to a speed gear side, and wherein a diameter of the first inner diameter portion is set to be larger than a diameter of the second inner diameter portion.

2. The shift device according to claim 1, wherein the diameter of the first inner diameter portion is set in such a way that the lever members are pushed by the high-speed-stage slanting surface of the sleeve until the splines of the sleeve contact with the splines of the synchronizer ring when the sleeve moves toward the speed gear and that the lever members become free from the high-speed-stage slanting surface after the splines of the sleeve contact with the splines of the synchronizer ring.

3. The shift device according to claim 2, further comprising:

a spring being capable of pushing the lever members outwardly in a radial direction of the shift device.

4. The shift device according to claim 1, further comprising:

a spring being capable of pushing the lever members outwardly in a radial direction of the shift device.

* * * * *